United States Patent
Sanada (10) Patent No.: US 7,675,460 B2
(45) Date of Patent: Mar. 9, 2010

(54) IN-VEHICLE RADAR APPARATUS AND METHOD FOR MANUFACTURING THE SAME

(75) Inventor: Hiromasa Sanada, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 5 days.

(21) Appl. No.: 11/984,985

(22) Filed: Nov. 26, 2007

(65) Prior Publication Data

US 2008/0122682 A1 May 29, 2008

(30) Foreign Application Priority Data

Nov. 27, 2006 (JP) ................ 2006-317887

(51) Int. Cl.
*G01S 7/40* (2006.01)
*G01S 13/93* (2006.01)

(52) U.S. Cl. .......... 342/173; 180/167; 180/169; 342/5; 342/70; 342/165; 342/174; 342/175; 342/195

(58) Field of Classification Search ........ 342/5–11, 342/27, 28, 70–81, 165–175, 195; 701/300, 701/301; 180/167–169; 343/711–717
See application file for complete search history.

(56) References Cited

U.S. PATENT DOCUMENTS

| | | | |
|---|---|---|---|
| 6,380,885 B2 * | 4/2002 | Shirai et al. | 342/70 |
| 6,714,156 B1 * | 3/2004 | Ibrahim et al. | 342/174 |
| 6,750,811 B2 * | 6/2004 | Asanuma et al. | 342/174 |
| 6,778,131 B2 * | 8/2004 | Haney et al. | 342/174 |
| 6,842,152 B2 * | 1/2005 | Kikuchi | 343/713 |
| 6,933,883 B2 * | 8/2005 | Isaji | 342/174 |
| 6,954,174 B2 * | 10/2005 | Isaji et al. | 342/173 |
| 2001/0024171 A1 * | 9/2001 | Nishimura | 342/70 |
| 2004/0017308 A1 | 1/2004 | Kikuchi | |
| 2004/0233094 A1 | 11/2004 | Isaji et al. | |

FOREIGN PATENT DOCUMENTS

| | | |
|---|---|---|
| EP | 1 480 055 A1 | 11/2004 |
| JP | A 2003-255042 | 9/2003 |
| JP | A 2004-12183 | 1/2004 |
| JP | A 2004-12184 | 1/2004 |
| JP | A 2004-12185 | 1/2004 |
| JP | A 2004-347512 | 12/2004 |
| JP | A-2007-125928 | 5/2007 |

* cited by examiner

*Primary Examiner*—Bernarr E Gregory
(74) *Attorney, Agent, or Firm*—Oliff & Berridge, PLC (57) ABSTRACT

An in-vehicle radar apparatus includes a beam emitting part that emits a beam, a casing that supports the beam emitting part, and a reference unit that is attached to the casing and is equipped with multiple surfaces usable as a reference plane. A surface of the casing to which the reference unit is attached and the reference plane form an angle that depends on which one of the multiple surfaces is used as the reference plane.

16 Claims, 8 Drawing Sheets

IN-VEHICLE RADAR APPARATUS AND METHOD FOR MANUFACTURING THE SAME

BACKGROUND OF THE INVENTION

1. Field of the Invention

The present invention relates to in-vehicle radar apparatuses and methods for manufacturing the apparatuses, and more particularly, to an in-vehicle radar apparatus having a reference plane for adjusting a beam axis and a method for manufacturing the same.

2. Description of the Related Art

An in-vehicle radar apparatus has been developed in order to secure vehicle travel safety. The in-vehicle radar apparatus emits a beam of radio waves in the millimeter wavelength range or laser, and detects a target such as another vehicle from the beam reflected by the target. It is desired to control the beam emission angle (beam axis) with respect to the vehicle for improvements in precision. In practice, poor accuracy in attachment of an antenna to a casing may cause the angle of the beam axis with respect to the casing to deviate from the designed value. Thus, the beam axis cannot be controlled precisely when the in-vehicle radar apparatus is attached to the vehicle with the casing being used as a reference plan. Japanese Patent Application Publication No. 2004-347512 discloses a reference plane aligned with the beam axis at the time of shipment of the in-vehicle radar apparatus. The beam axis is aligned with the reference plane when the radar apparatus is attached to the vehicle.

In practice, the beam axis with respect to the casing deviates from the target value by ±2° to ±3°, while the beam axis with respect to the vehicle is desired to be aligned within ±3°. Thus, the technique disclosed in the above-mentioned publication is used along with various kinds of correction units, and an appropriate one of these correction units is selected to align the beam axis with the reference plane. However, it is troublesome to prepare and manage different kinds of correction units.

SUMMARY OF THE INVENTION

The present invention has been made in view of the above-mentioned circumstances.

According to an aspect of the present invention, there is provided an in-vehicle radar apparatus including: a beam emitting part that emits a beam; a casing that supports the beam emitting part; and a reference unit that is attached to the casing and is equipped with multiple surfaces usable as a reference plane, a surface of the casing to which the reference unit is attached and the reference plane forming an angle that depends on which one of the multiple surfaces is used as the reference plane.

According to another aspect of the present invention, there is provided a method for manufacturing an in-vehicle radar apparatus including the steps of: measuring a direction of emission of a beam emitted from a beam emitting part supported by a casing; and attaching a reference unit to the casing so that one of multiple surfaces of the reference unit is used as a reference plane for adjusting the direction of emission of the beam.

According to yet another aspect of the present invention, there is provided a reference unit including: multiple surfaces usable as a reference plane; and a fixing surface used to attach the reference unit to a casing of an apparatus, wherein a surface of the casing to which the reference unit is attached and the reference plane form an angle that depends on which one of the multiple surfaces is used as the reference plane.

According to a further aspect of the present invention, there is provided a method for adjusting a direction of emission of a beam including the steps of: measuring the direction of emission of the beam emitted from a beam emitting part supported by a casing; and adjusting the direction of emission of the beams by attaching a reference unit to the casing so that one of multiple surfaces of the reference unit is used as a reference plane for adjusting the direction of emission of the beam, and the direction of emission of the beam is aligned with the reference plane.

DESCRIPTION OF THE PREFERRED EMBODIMENTS

First Embodiment

A description will now be given of a first embodiment of the present invention.

Figure 1A:
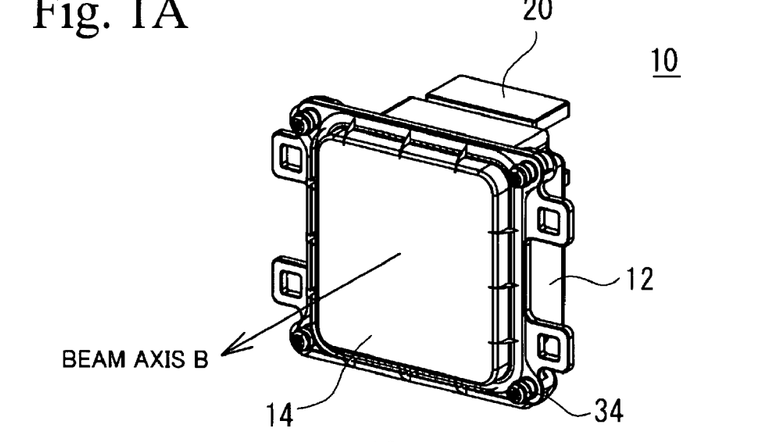
FIGS. 1A, 1B and 1C are respectively perspective views of an in-vehicle radar apparatus in accordance with a first embodiment of the present invention.
Figure 1B:
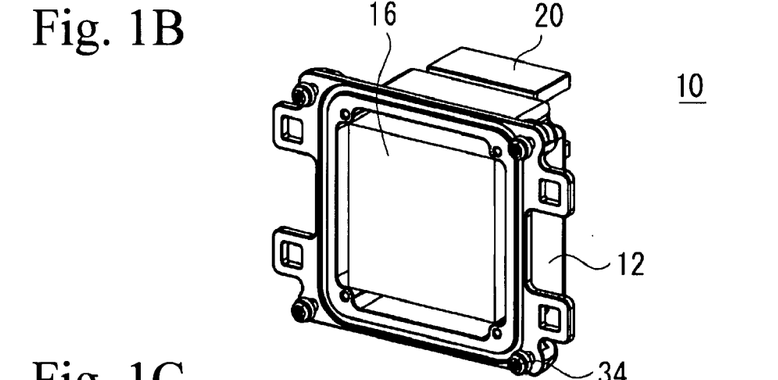
Figure 1C:
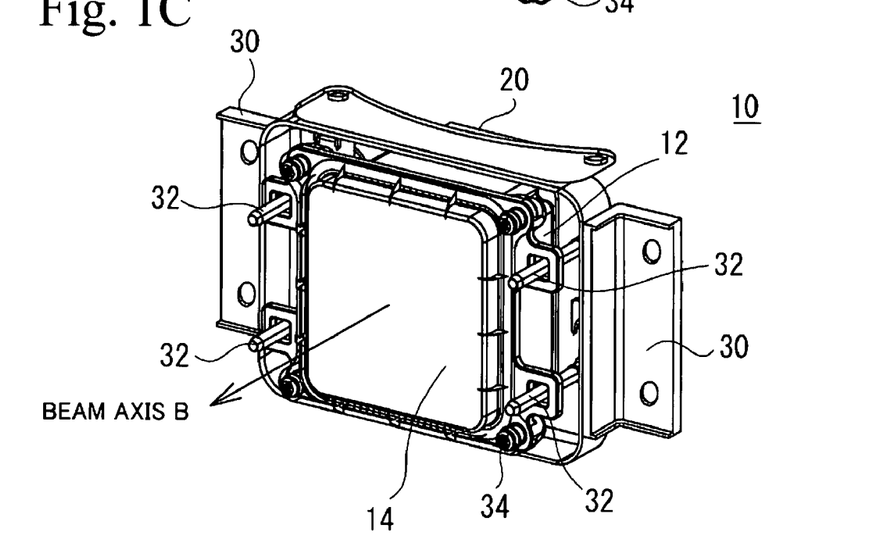

FIG. 1A is a perspective view of the front of an in-vehicle radar apparatus 10 in accordance with a first embodiment, FIG. 1B is a perspective view of the in-vehicle radar apparatus 10 from which a cover has been removed, and FIG. 1C is a perspective view of the in-vehicle radar apparatus 10 to which a bracket is attached. A cover 14 for an antenna is provided to the front of a casing 12, as shown in FIG. 1A. An antenna 16, which is an exemplary beam emitting part, is mounted on the casing 12, as shown in FIG. 1B. A beam of a millimeter wave emitted from the antenna 16 passes through the cover 14 and is emitted forward. The direction of the center of beam emission is a beam axis B. As shown in FIG. 1C, a bracket 30 is used to attach the in-vehicle radar apparatus 10 to a vehicle. Adjustment bolts 32 are used to precisely align the direction of the beams axis B and the direction of the front of the vehicle with each other.

Figure 2A:
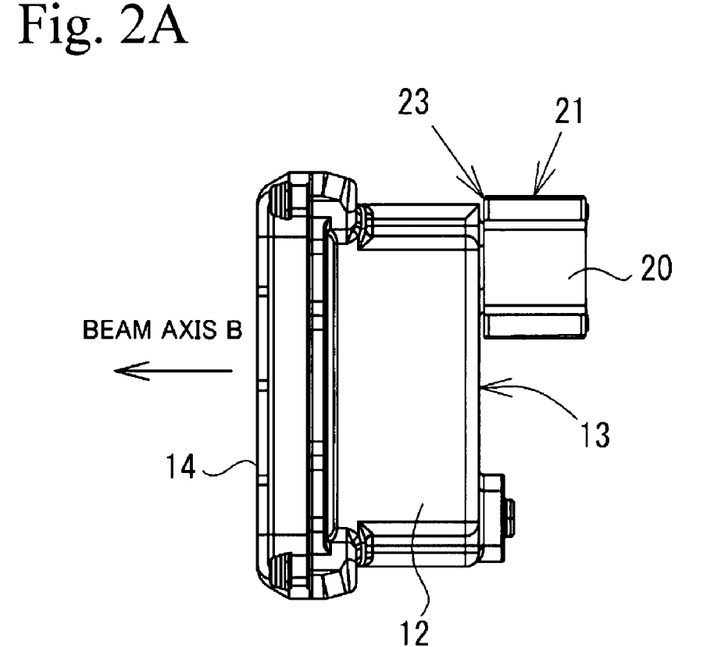
FIG. 2A is a side view of the in-vehicle radar apparatus of the first embodiment.
Figure 2B:
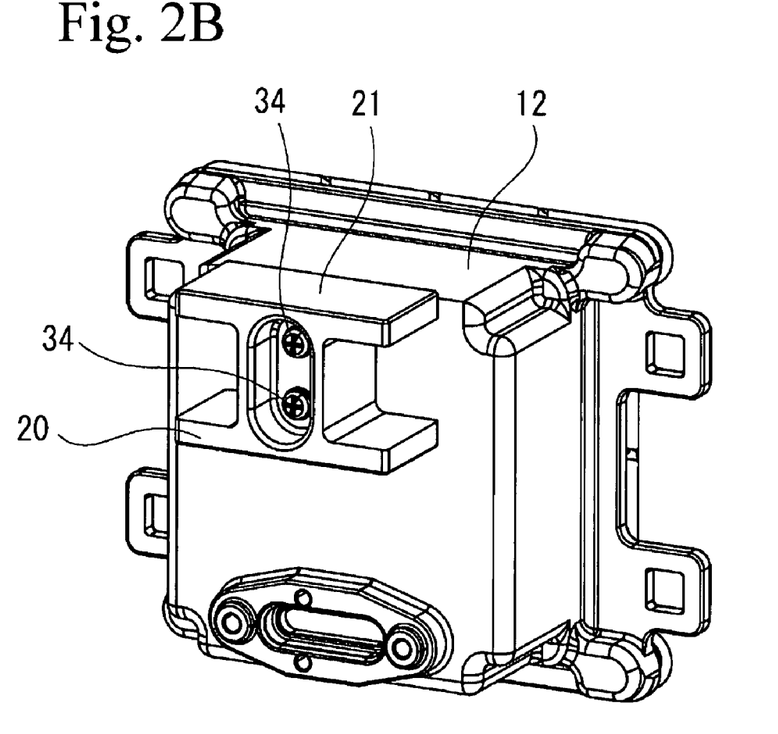
FIG. 2B is a back view of the in-vehicle radar apparatus of the first embodiment.

FIG. 2A is a side view of the in-vehicle radar apparatus 10. A reference unit 20 is provided on a back surface 13 of the casing 12. The reference unit 20 is fixed to the casing 12 on a fixing surface 23 by a screw. A top surface of the reference unit 20 functions as a reference plane 21. FIG. 2B is a perspective view of a back of the in-vehicle radar apparatus 10. The reference unit 20 is fixed to the back surface 13 of the casing 12 by screws 34.

Figure 3:
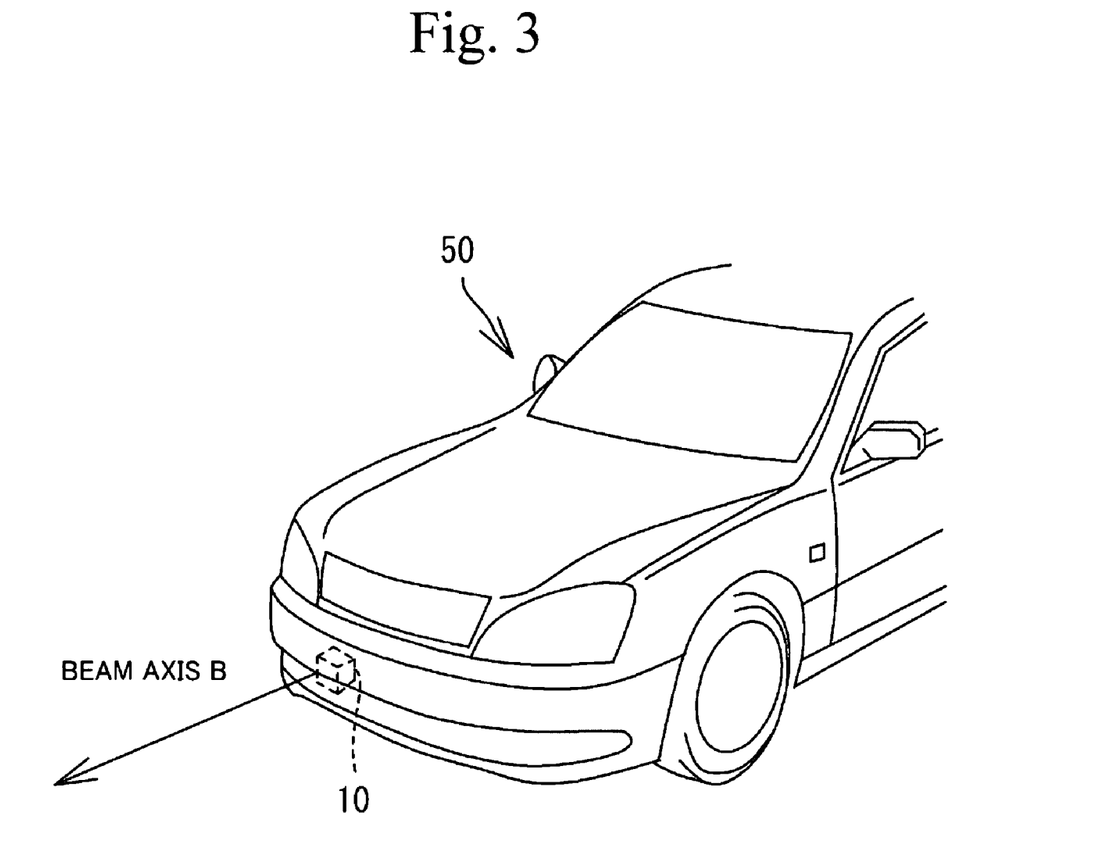
FIG. 3 is a view of the in-vehicle radar apparatus attached to a vehicle.
Figure 4:
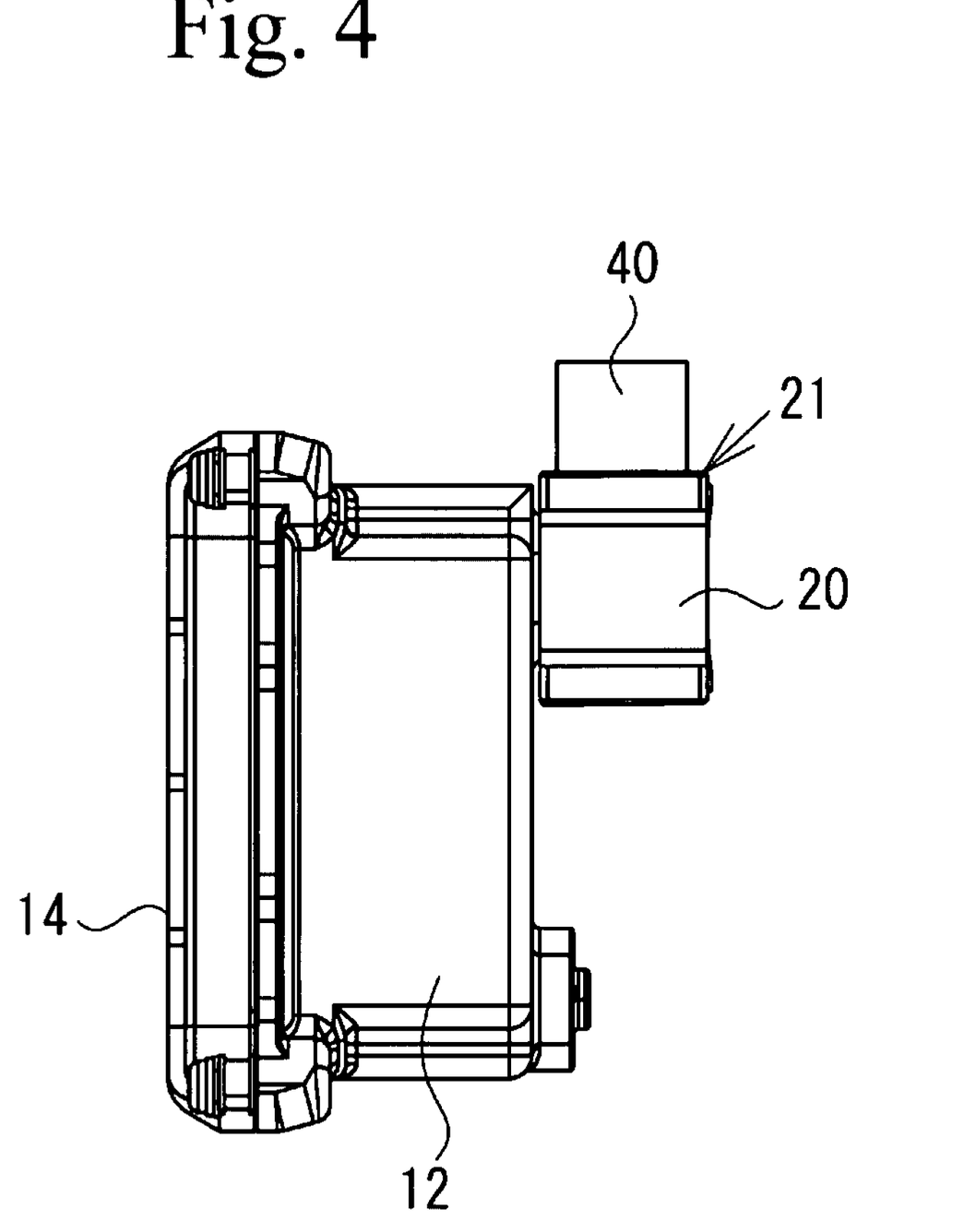
FIG. 4 shows an adjustment of a beam axis of the in-vehicle radar apparatus.

FIG. 3 is a perspective view of the in-vehicle radar apparatus 10 attached to a vehicle 50. The in-vehicle radar apparatus 10 is attached to a front of the vehicle 50, and the beam axis B is oriented in the front direction of the vehicle 50. When the in-vehicle radar apparatus 10 is attached to the vehicle 50, the bracket 30 is fixed to the vehicle 50. Next, as shown in FIG. 4, a level 40 is placed on the reference plane 21 of the reference unit 20, and the adjustment bolts 32 are used to make the reference plane 21 horizontal. When the horizontal direction of the reference plane 21 is parallel to the beams axis B in the adjustment, the beam axis B can be set horizontal. It is no longer necessary to measure the intensity distribution of the beam for adjustment of the beam axis B at the time of attaching the in-vehicle radar apparatus 10 to the vehicle 50. According to the first embodiment, the attachment angle of the casing 12 is adjusted based on the reference plane 21, so that the beam axis B can be adjusted in a desired direction.

Figure 5A:
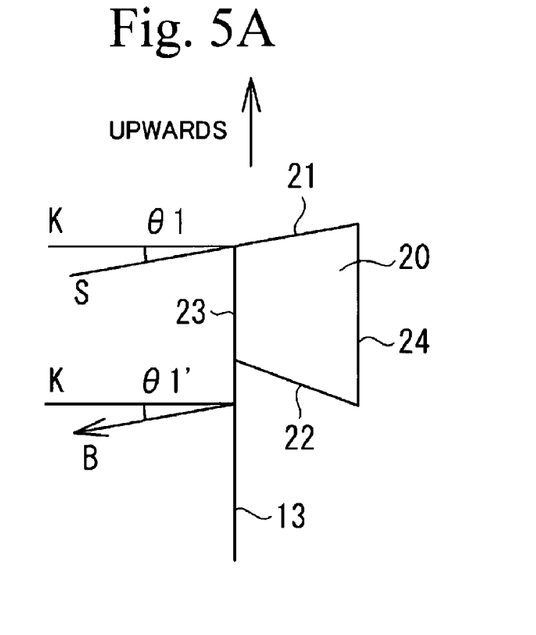
FIGS. 5A through 5D show methods for attaching a reference unit to a casing.

FIGS. 5A through 5D schematically show four methods for fixing the reference unit 20 to the back surface 13 of the casing 12. In these figures, K is the perpendicular line of the back surface 13 of the casing 12, B is the beam axis, and S is the horizontal direction of the reference plane 21. The plane used as a reference faces upwards. FIG. 5A shows a case where the beam axis B is in a downward direction by an angle θ1' with respect to the perpendicular line K of the back surface 13. In this case, the reference unit 20 is fixed to the back surface 13 of the casing 12 on the fixing surface 23, and the surface 21 of the reference unit 20 is the reference plane. The direction of the reference plane 21 is downwards by an angle θ1 with respect to the perpendicular line K of the back surface 13. When θ1 is approximately equal to θ1', the direction S of the reference plane 21 is made parallel to the beam axis B with a desired tolerance.

Figure 5B:
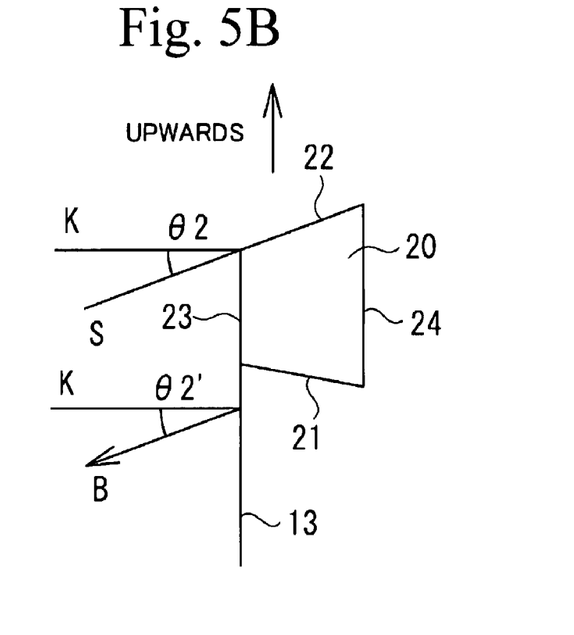

FIG. 5B shows a case where the beam axis B is further downwards with respect to the perpendicular line K of the back surface 13 and is at an angle θ2', and the reference unit 20 is placed upside down so that a surface 22 of the reference unit 20 is used as the reference plane. It is thus possible to set the angle between the direction S of the reference plane 22 and the perpendicular line K of the back surface 13 equal to θ2 greater than θ1. Thus, when θ2 and θ2' are approximately equal to each other, the direction S of the reference plane 21 can be made parallel to the beam axis B within a desired tolerance.

Figure 5C:
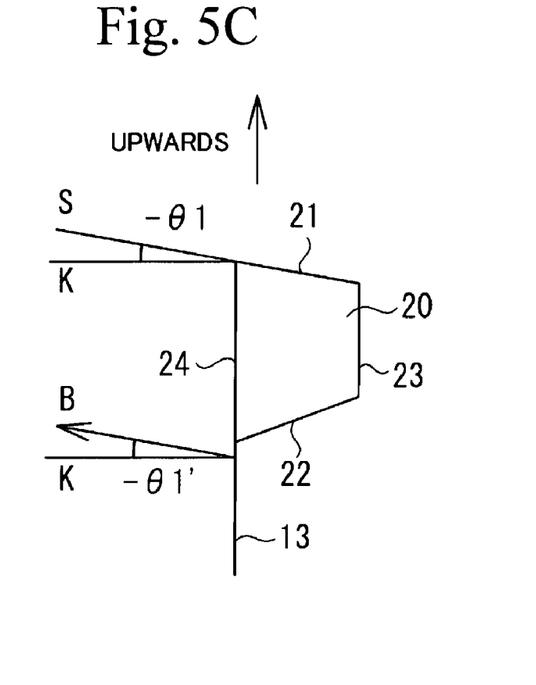

FIG. 5C shows a case where the beam axis B is in an upward direction with respect to the perpendicular line K of the back surface 13, and the reference unit 20 is fixed to the back surface 13 on a fixing surface 24, the surface 21 being used as the reference plane. Thus, when θ1 and θ1' are approximately equal to each other, the direction S of the reference plane 21 can be made parallel to the beam axis B within a desired tolerance.

Figure 5D:
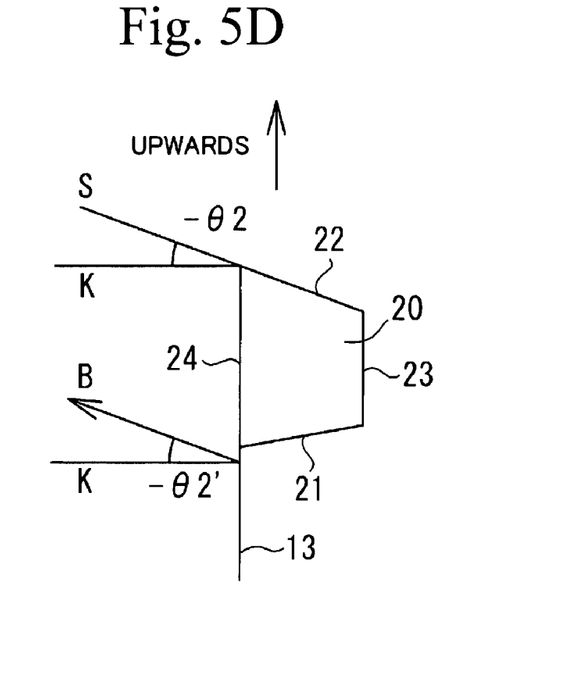

FIG. 5D shows a case where the axis B is further upwards by an angle θ2' (>θ2) with respect to the perpendicular line K of the back surface 13, and the reference unit 20 is fixed to the back surface 13 on the fixing surface 24, the surface 22 being used as the reference plane. Thus, when θ2 and θ2' are approximately equal to each other, the direction S of the reference plane 21 can be made parallel to the beam axis B within a desired tolerance.

The first embodiment measures the direction of the beam emission (beam axis B) from the antenna 16 (beam emitting part) attached to the casing 12 and fixes the reference unit 20 to the casing 12 so that an appropriate one of the multiple surfaces 21 and 22 can be selected as the reference plane (upward plane) in association with the beam axis B. The angle between the surface of the casing 12 to which the reference unit 20 is fixed and the reference plane 21 or 22 depends on which one of the reference planes 21 and 22 is selected. Thus, the single reference unit 20 functions as four different correction members for correcting the angle of the beam axis B with respect to the casing 12. It is thus possible to reduce the number of types of components involved in correcting the beam axis B and reduce the number of management steps for components.

In the above-mentioned description of the first embodiment, the reference plane is the upward surface. The reference plane may be a surface that faces in a predetermined direction. The reference unit 20 may be fixed to an arbitrary surface of the casing 12 other than the back surface 13. Such an arbitrary surface may be the side, upper or lower surface of the casing 12. When the reference plane faces upwards or downwards, it is possible to correct deviations of the beam axis B in the vertical direction (up and down directions) of the vehicle 50. Similarly, when the reference plane faces rightwards or leftwards, it is possible to correct deviations of the beam axis B in the horizontal direction (right and left directions) of the vehicle 50. It is thus possible to select an appropriate one of the direction of the reference plane taking into consideration the direction S of the beam axis B in which there is a deviation that affects the performance of the in-vehicle radar apparatus. It is also possible to provide the reference unit 20 with two reference planes and to thus correct deviations in the vertical and horizontal directions of the beam axis B.

As described above, the horizontal direction S of the reference plane (21 or 22) may be set approximately parallel to the beam direction B (beam emitting direction). Thus, the horizontal direction of the reference plane may be aligned with a desired direction in attachment of the in-vehicle radar apparatus 10 to the vehicle 50, so that the beam can be set in the desired direction with respect to the vehicle.

It is enough to associate the reference plane 21 or 22 that faces upwards with the beam axis B. For example, the direction S of the reference plane and the beam axis B may form a constant angle instead of the parallel arrangement. The beam axis can be set in the desired direction by attaching the in-vehicle radar apparatus to the vehicle 50 while taking the constant angle into account.

The in-vehicle radar apparatus 10 is fixed to the casing 12 and has the bracket (attachment part) 30 for attachment to the vehicle 50. It is thus possible to attach the in-vehicle radar apparatus 10 to the vehicle 50.

The adjustment of the beam axis B using the reference plane may be carried out at the time of maintenance of the vehicle 50.

In short, the first embodiment has the antenna 16, the casing 12 that supports the antenna 16, and the reference unit 20 that is attached to the casing 12 and is equipped with multiple surfaces 21 and 22 usable as a reference plane, wherein the surface of the casing to which the reference unit 20 is attached and the reference plane forming an angle that depends on which one of the multiple surfaces is used as the reference plane.

Second Embodiment

Figure 6A:
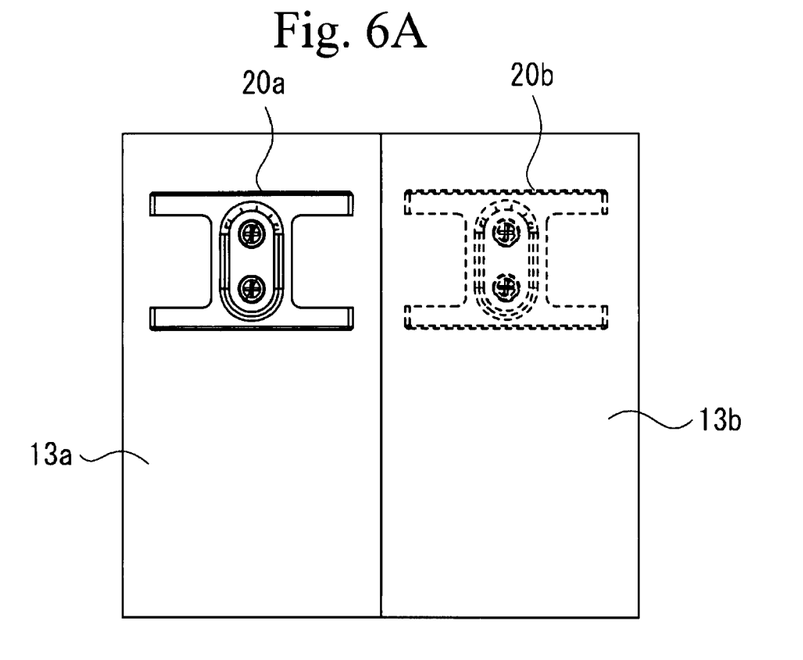
FIG. 6A is a back view of an in-vehicle radar apparatus in accordance with a second embodiment.
Figure 6B:
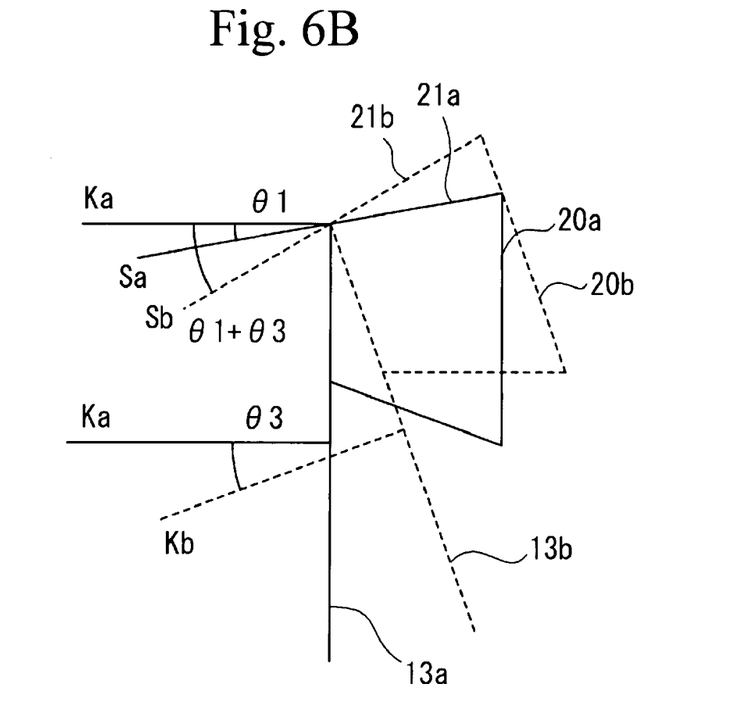
FIG. 6B is a side view of the in-vehicle radar apparatus in accordance with the second embodiment.

A second embodiment is an exemplary in-vehicle radar apparatus in which the casing has multiple surfaces to which the reference unit 20 may be attached. FIG. 6A schematically shows a back view of the in-vehicle radar apparatus of the second embodiment, and FIG. 6 schematically shows a side view thereof. The casing 12 has two surfaces 13a and 13b as a back surface. A perpendicular line Ka of the surface 13a and a perpendicular line Kb of the surface 13b form an angle θ3. Thus, the direction of the reference plane has different angles that depend on cases where the reference unit 20 is attached to the surfaces 13a and 13b and is used as the reference units 20a and 20b, respectively. For the reference unit 20a, the direction Sa of the reference plane 21a with respect to the perpendicular line Ka of the surface 13a has an angle θ1. For the reference unit 20b, the direction Sb of the reference plane 21b with respect to the perpendicular line Ka of the surface 13a has an angle equal to θ1+θ3. It is thus possible to define eight different reference planes using the reference unit 20 using four reference planes. As described above, when the casing 12 has an increased number of surfaces for attachment of the reference unit 20, an increased number of reference planes are available. It is thus possible to further reduce the number of types of components and reduce the number of management steps for components.

Third Embodiment

Figure 7A:
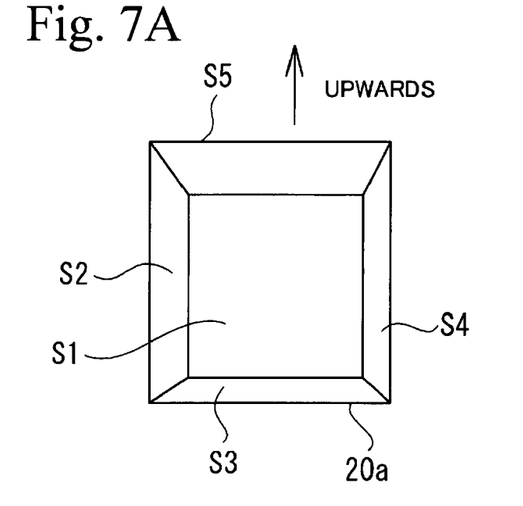
FIG. 7A is a front view of a reference unit employed in a third embodiment.
Figure 7B:
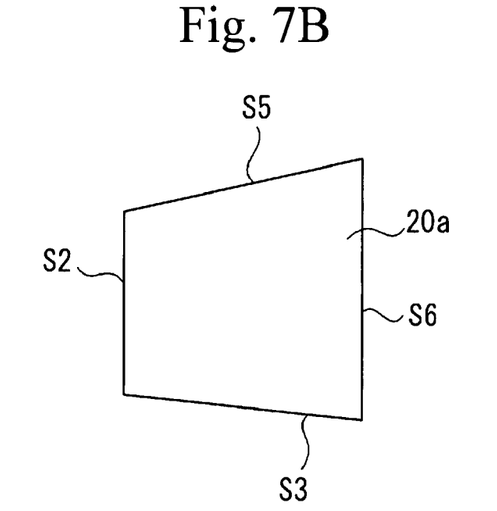
FIG. 7B is a side view of the reference unit shown in FIG. 7A.
Figure 7C:
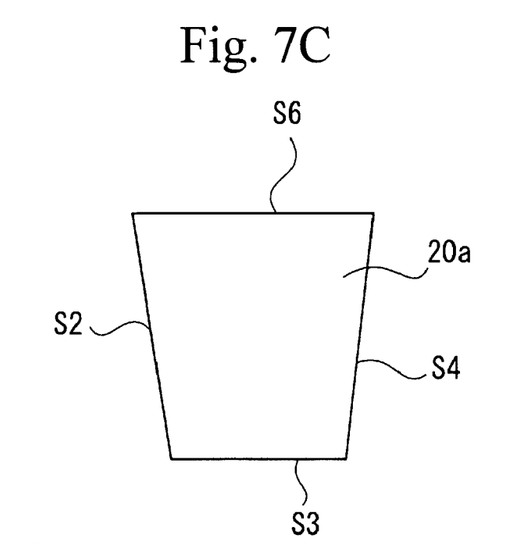
FIG. 7C is a top view of the reference unit shown in FIG. 7A.

FIGS. 7A through 7C show a reference unit 20a employed in a third embodiment in which screw holes for fixing an in-vehicle radar apparatus to the casing are not illustrated for the sake of simplicity. In the third embodiment, for example, a surface S1 is fixed to the casing 12 (that is, the surface S1 is used as a fixing surface), and any of the surfaces S2 to S5 may be used as the reference plane. The surface S2 is used for attachment, and any of the surfaces S1, S3, S5 and S6 may be used as the reference plane. In this manner, any one of the surfaces S1 to S6 may be used for attachment, and any one of the surfaces S1 to S6 may be used as the reference plane. The third embodiment has the six surfaces, any of which may be used as the reference plane and used for attachment. The third embodiment is capable of providing a large number of reference planes by means of the single-piece reference unit, as compared to the first embodiment.

Fourth Embodiment

Figure 8:
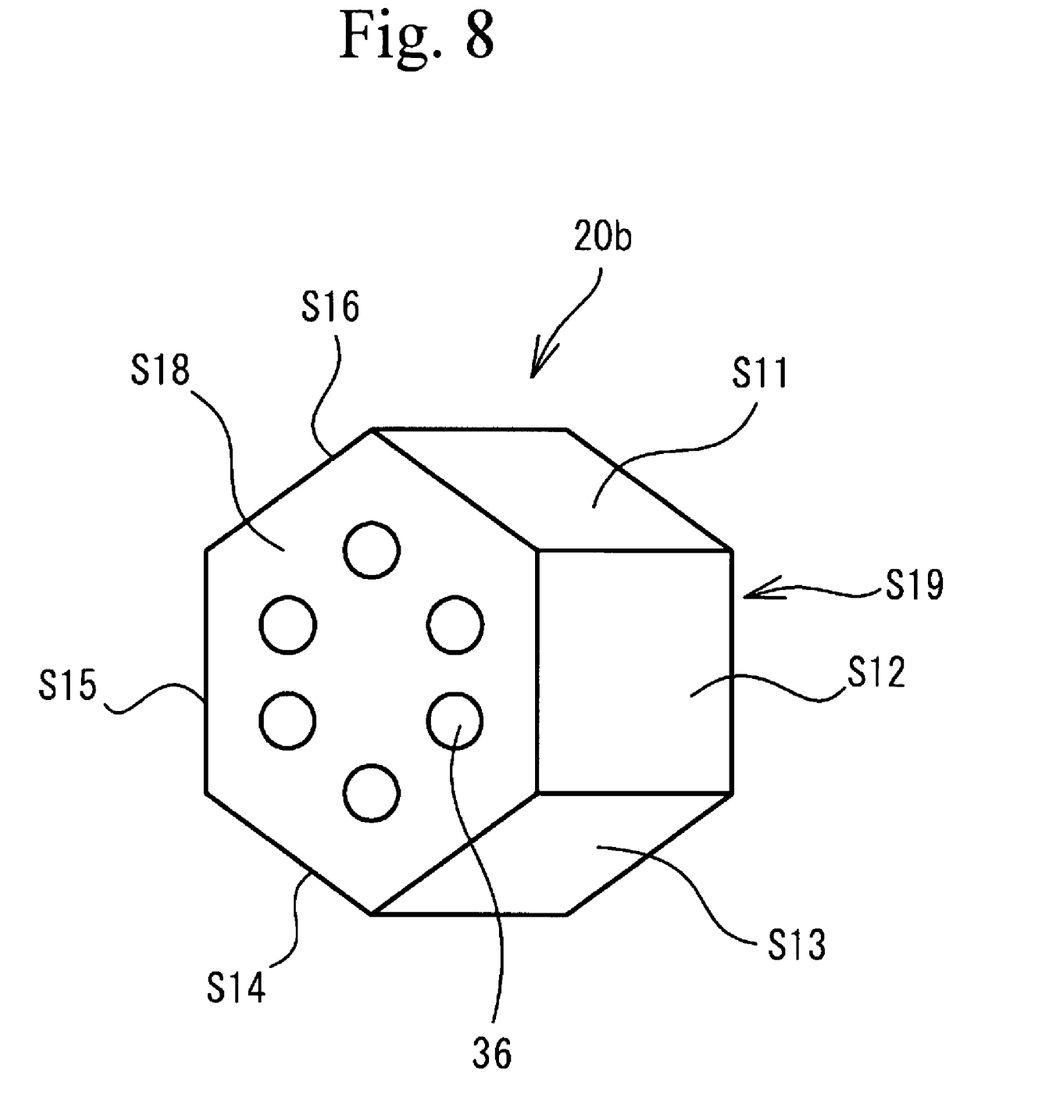
FIG. 8 is a perspective view of a reference unit employed in a fourth unit.

FIG. 8 show a reference unit 20b used in a fourth embodiment. A surface S18 or S19 of the reference unit 20b is used as a fixing surface through which the reference unit 20b is fixed to the casing 12 using screw holes 36. Six surfaces S11 through S16 may be used as the reference plane. The reference unit 20b of the fourth embodiment is capable of defining the multiple reference planes.

As in the cases of the first and fourth embodiments, the reference unit 20 or 20b has the fixing surface 23 or S18, and the surfaces 21 and 22 or S11 through S16 that may be used as the reference plane may include a surface that contacts the fixing surface 23 or S18. As in the case of the third embodiment, the surfaces of the reference unit 20a that may be used as multiple reference planes may include the fixing surface (for example, S1) and the surface opposite to the fixing surface (for example, S4).

The first through fourth embodiments are in-vehicle radar apparatuses that emit the beams forwards. The in-vehicle radar apparatus may emit the laser backwards. The beam is not limited to the millimeter wave but may be an electromagnetic wave, ultrasonic wave or infrared rays. The reference units 20, 20a and 20b of the first through fourth embodiments may be applied to in-vehicle lights or in-vehicle cameras that may be used for image recognition.

The present invention is not limited to the specifically disclosed embodiments, but may include other embodiments and variations without departing from the scope of the present invention.

The present application is based on Japanese Patent Application No. 2006-317887, the entire disclosure of which is hereby incorporated by reference.

What is claimed is:

1. An in-vehicle radar apparatus comprising:
   a beam emitting part that emits a beam;
   a casing that supports the beam emitting part; and
   a reference unit that is attached to the casing and is equipped with multiple surfaces, each of the multiple surfaces being used as a reference plane,
   wherein a surface of the casing to which the reference unit is attached and the reference plane form an angle that depends on which one of the multiple surfaces is used as the reference plane.

2. The in-vehicle radar apparatus as claimed in claim 1, wherein the reference plane is associated with a direction in which the beam is emitted.

3. The in-vehicle radar apparatus as claimed in claim 1, wherein a horizontal direction of the reference plane is parallel to a direction in which the beam is emitted.

4. The in-vehicle radar apparatus as claimed in claim 1, wherein the reference unit has a fixing surface attached to the casing, and the multiple surfaces include a surface that contacts the fixing surface.

5. The in-vehicle radar apparatus as claimed in claim 1, wherein the reference unit has a fixing surface attached to the casing, and the multiple surfaces include the fixing surface and a surface opposite to the fixing surface.

6. The in-vehicle radar apparatus as claimed in claim 1, wherein the casing has multiple surfaces to which the reference unit is attachable.

7. A method for manufacturing an in-vehicle radar apparatus comprising the steps of:
   measuring a direction of emission of a beam emitted from a beam emitting part supported by a casing; and
   attaching a reference unit to the casing so that one of multiple surfaces of the reference unit is used as a reference plane for adjusting the direction of emission of the beam,
   wherein a surface of the casing to which the reference unit is attached and the reference plane form an angle that depends on which one of the multiple surfaces is used as the reference plane.

8. The method as claimed in claim 7, wherein the reference plane is associated with a direction of emission of the beam.

9. The method as claimed in claim 7, wherein the step of attaching the reference unit to the casing includes a step of fixing the reference unit to the casing so that a horizontal direction of the reference plane is parallel to a direction of emission of the beam.

10. A reference unit comprising:
    multiple surfaces, each of the multiple surfaces being used as a reference plane; and
    a fixing surface used to attach the reference unit to a casing of an apparatus, wherein the fixing surface and the reference plane form an angle that depends on which one of the multiple surfaces is used as the reference plane.

11. The reference unit as claimed in claim 10, wherein the multiple surfaces include opposite surfaces inclined at different angles with respect to the fixing surface.

12. The surface unit as claimed in claim 10, wherein the reference unit further includes another fixing surface opposite to the fixing surface.

13. The surface unit as claimed in claim 10, wherein the fixing surface is one of the multiple surfaces.

14. The surface unit as claimed in claim 10, wherein the multiple surfaces include a surface that contacts the fixing surface.

15. The surface unit as claimed in claim 10, wherein the multiple surfaces include the fixing surface and a surface opposite to the fixing surface.

16. A method for adjusting a direction of emission of a beam comprising the steps of:

measuring the direction of emission of the beam emitted from a beam emitting part supported by a casing; and adjusting the direction of emission of the beams by attaching a reference unit to the casing so that one of multiple surfaces of the reference unit is used as a reference plane for adjusting the direction of emission of the beam, and the direction of emission of the beam is aligned with the reference plane, wherein a surface of the casing to which the reference unit is attached and the reference plane form an angle that depends on which one of the multiple surfaces is used as the reference plane.

* * * * *